Sept. 18, 1956     T. K. LIVERSIDGE     2,763,183
STAR PROJECTOR APPARATUS
Filed April 15, 1954                               3 Sheets-Sheet 1
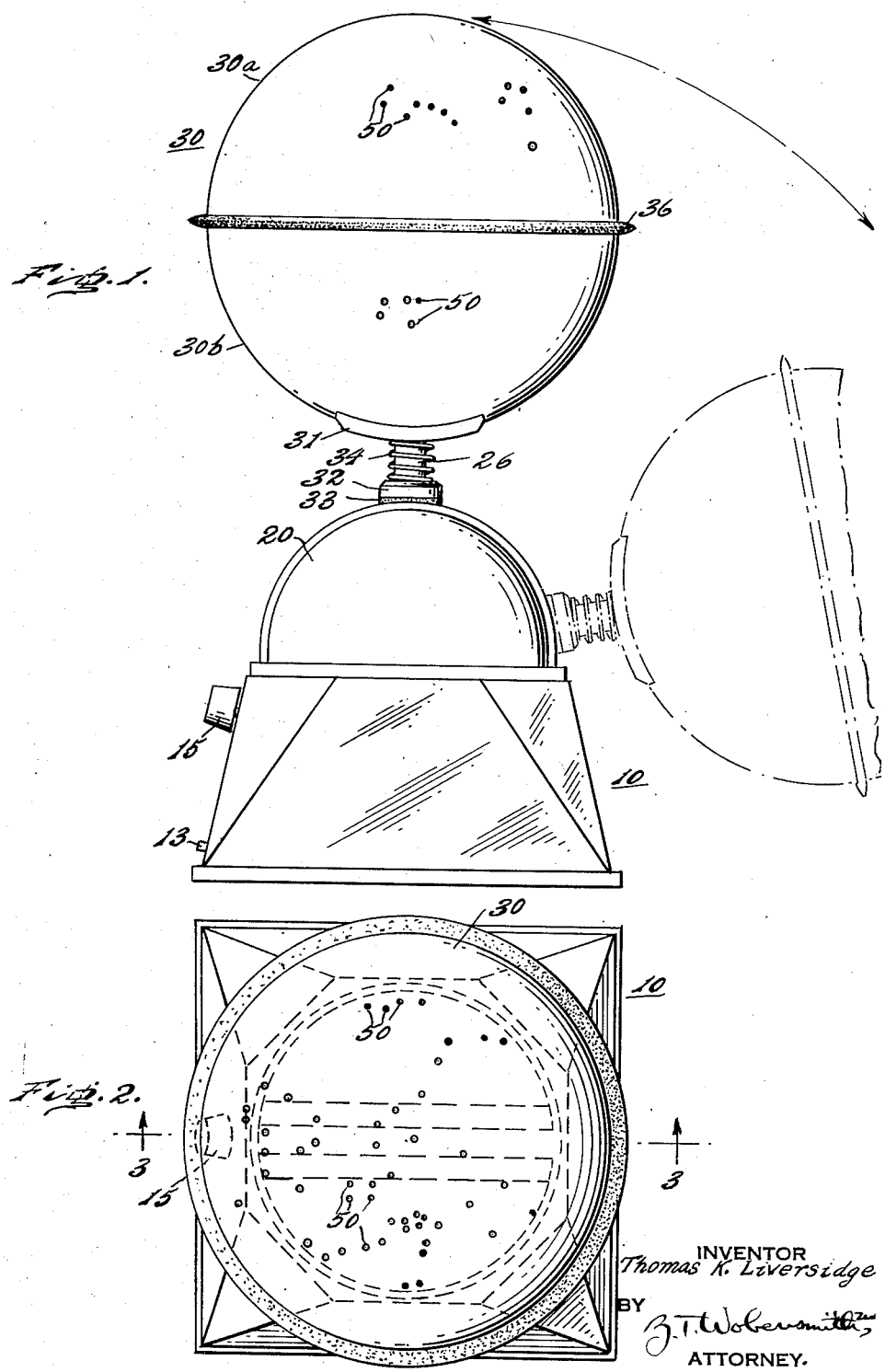
INVENTOR
Thomas K. Liversidge
BY
ATTORNEY.

Sept. 18, 1956 T. K. LIVERSIDGE 2,763,183
STAR PROJECTOR APPARATUS
Filed April 15, 1954 3 Sheets-Sheet 2

INVENTOR
Thomas K. Liversidge
BY
ATTORNEY.

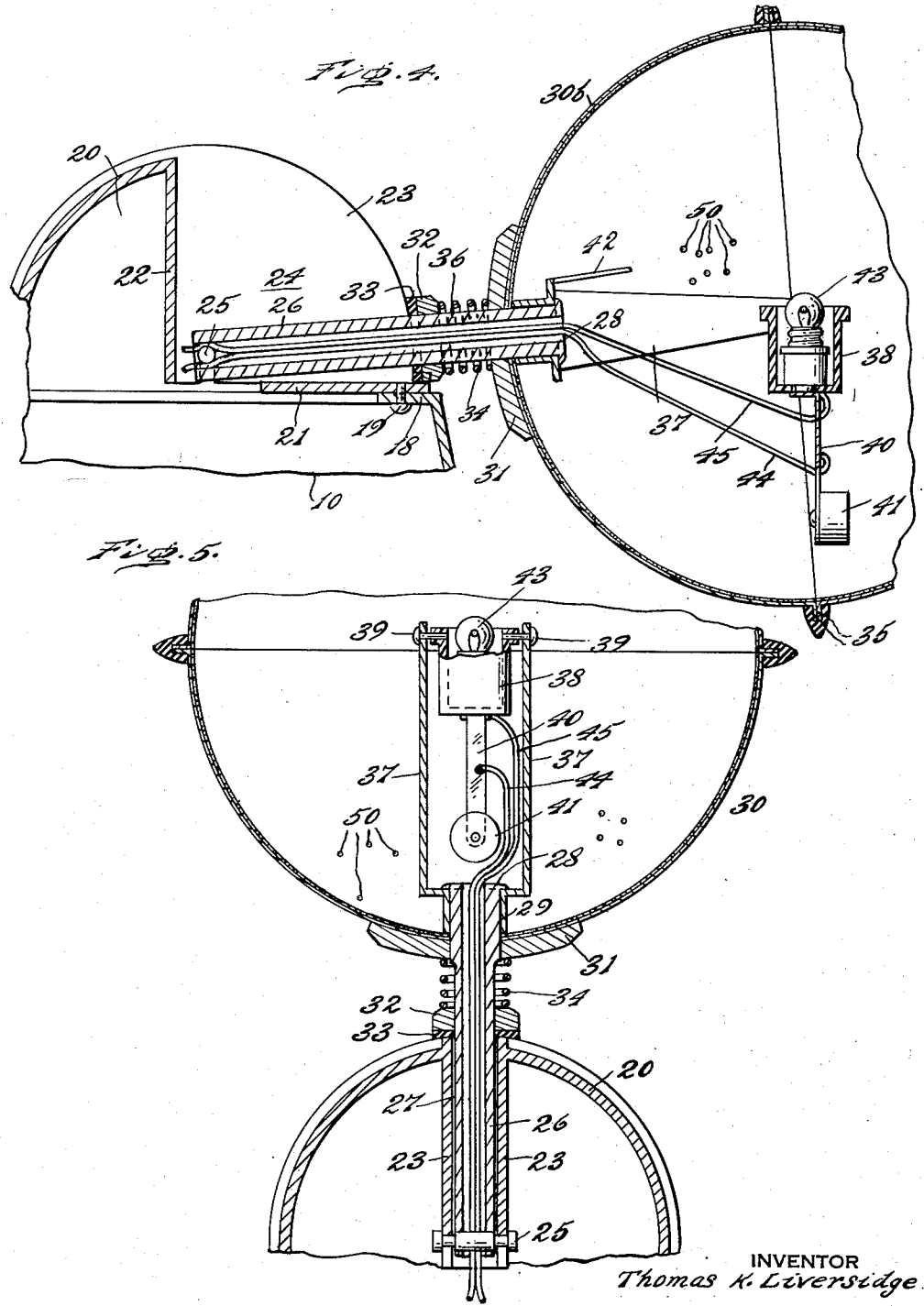

United States Patent Office  
2,763,183  
Patented Sept. 18, 1956

2,763,183

STAR PROJECTOR APPARATUS

Thomas K. Liversidge, Phoenixville, Pa.

Application April 15, 1954, Serial No. 423,369

9 Claims. (Cl. 88—24)

This invention relates to star projectors and more particularly to apparatus with which projections of the stars in their relation to each other in the various constellations and in the relation of the constellations to each other may be made available for home and school study.

It is a principal object of the present invention to provide a star projector which is relatively simple yet sturdy in construction.

It is a further object of the present invention to provide a star projector which may be readily adjusted, as desired, to selected dispositions corresponding to views of the heavens at different latitudes.

It is a further object of the present invention to provide a star projector which can be quickly and easily constructed so that it may be inexpensively manufactured and thus be made available to large numbers of interested persons.

It is a further object of the present invention to provide a star projector having an improved character of light source and mounting.

It is a further object of the present invention to provide a star projector having an improved form of light transmission.

Other objects and advantageous features of the invention will be apparent from the specification and claims.

The nature and characteristic features of the invention will be more readily understood from the following description, taken in connection with the accompanying drawings forming part thereof, in which:

Figure 1 is a side elevational view of a preferred form of star projector in accordance with the invention;

Fig. 2 is a top plan view of the star projector shown in Fig. 1;

Fig. 4 is a fragmentary sectional view similar to Fig. 3, of a part of the structure shown in Fig. 3, in another position; and Fig. 5 is a fragmentary sectional view taken approximately on the line 5—5 of Fig. 3.

Figure 3:
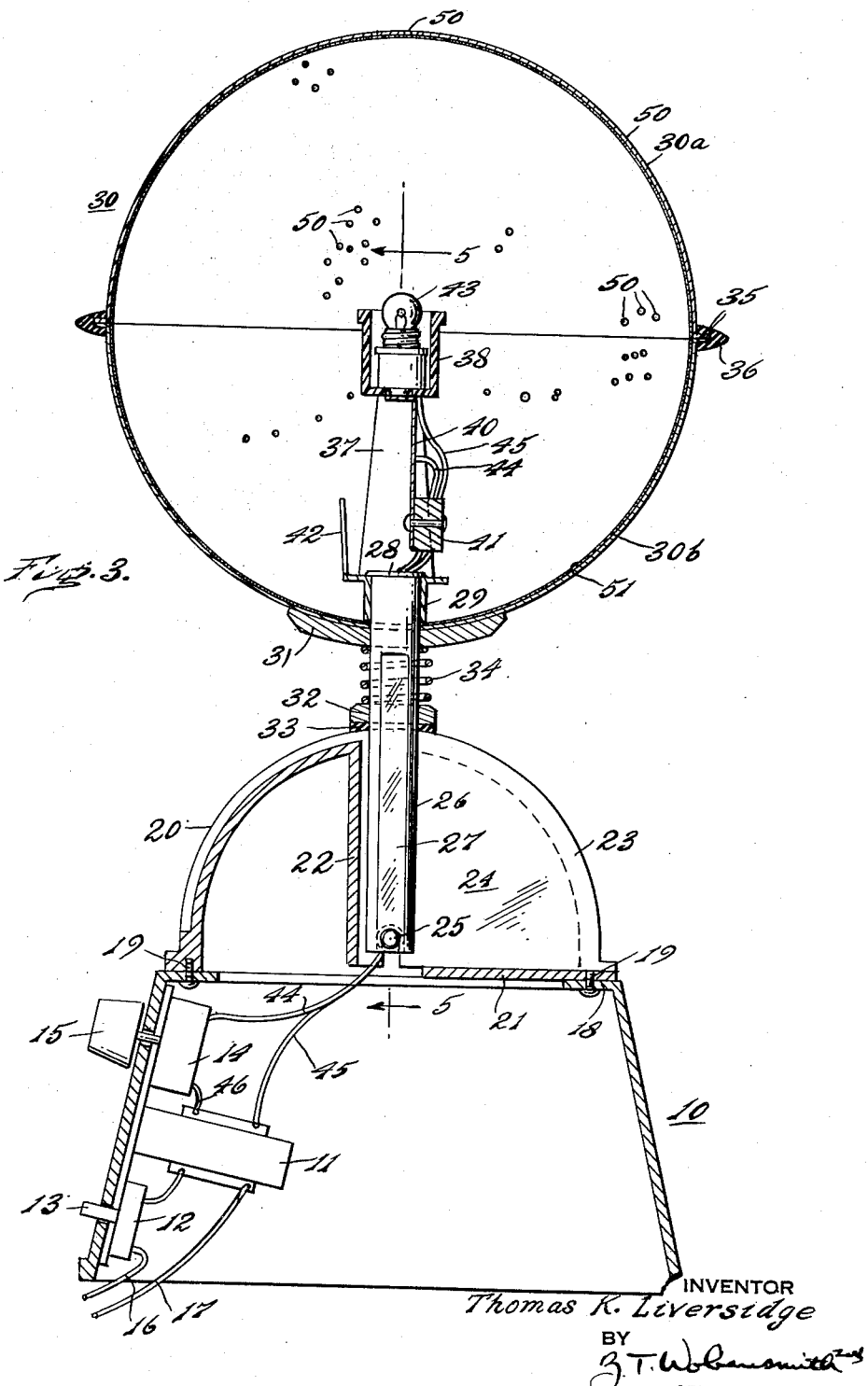
Fig. 3 is a vertical central sectional view taken approximately on the line 3—3 of Fig. 2.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the star projector in accordance with the invention preferably includes a hollow base 10, preferably of molded synthetic plastic material, within which a step down transformer 11 is mounted in the interior, together with an electric switch 12 having an exteriorly accessible actuator arm 13, and a rheostat 14 having an exteriorly accessible actuator knob 15. Power leads 16 and 17, connected through the switch 12 and to the primary of the transformer 11 are also provided, for connection to a conventional 110 volt A. C. supply in the usual manner.

The base 10 preferably has an inwardly extending vertical rim 18 for the reception of a dome 20, the dome 20 being secured in position on the rim 18 in any desired manner, such as by rivets 19.

The dome 20 is shown as of molded synthetic plastic material and may have any preferred exterior shape but is preferably hemispherical with a lower horizontal wall section 21, a vertical wall section 22 and spaced vertical wall sections 23 providing a quadrantal channel 24. The wall sections 23 preferably have a pivot pin 25 extending therebetween for engagement in the lower end of a hollow mounting post 26. The post 26 preferably has a pair of opposed flat side faces 27.

The post 26 has an enlarged upper head 28 which is in engagement with a mounting sleeve 29 which extends around the post 26 below the head 28.

A hollow sphere 30 is provided, preferably made in two half sections 30a and 30b, and the lower half section 30b is mounted on the post 26, which extends therethrough, for rotational movement, the sleeve 29 engaging the interior of the lower section 30b. Spaced washers 31 and 32 are provided on the post 26, the washer 31 being in engagement with the section 30b, and the washer 32 being in engagement with a washer 33, of rubber or the like, which in turn frictionally engages the outer face of the dome 20 on both sides of the channel 24. A compression spring 34 is interposed on the post 26 between the washers 31 and 32. It will be seen that the sphere 30, on the post 26, may be swung, as permitted by the mounting of the post in the channel 24 from an upright position as shown in Fig. 3 to a downward position with its axis close to the horizontal as shown in Fig. 4, and that the sphere 30 may also be turned by hand on the axis provided by the post 26.

The sections 30a and 30b are preferably removably held in assembled relation by flanges 35 with which a resilient holding ring 36 is in engagement. Suitable gage marks (not shown) may be provided on the flanges 35 to insure the proper alinement and relative positioning of the sections 30a and 30b upon initial assembly and subsequent reassembly.

The sleeve 29 has spaced arms 37 extending therefrom within which a lamp socket 38 is pivotally mounted by pins 39. The lamp socket 38 has a counterweight arm 40 and counterweight 41 secured thereto so that the socket 38 faces upwardly even though the axis of the post 26 is inclined. A stop arm 42 is preferably provided on the sleeve 29 to limit the movement of the counterweight 41.

The lamp socket 38 is preferably provided with an incandescent electric lamp 43 having a filament in the nature of a point or ball source of light. The flanged margins of the lamp socket 38 provide a screen limiting the light transmitted from the source to substantially the upper half of the interior of the sphere 30 whatever its inclination may be and thus preserves the effect of the normal horizon.

Insulated electric conductors 44 and 45 are provided from the socket 38 and extending through the interior of the post 26, to the rheostat 14 and to one terminal of the secondary of the transformer 11, respectively, and a conductor 46 extends from the rheostat 14 to the other terminal of the secondary of the transformer 11.

The sections 30a and 30b of the sphere 30, are preferably made of synthetic plastic material and provided with openings 50 therethrough, of relative sizes among themselves corresponding to the magnitude of the stars to be projected, arranged as seen from the interior in accordance with the constellations as they appear in the sky and with the constellations in their relative positions. The interior of the sections 30a and 30b is preferably coated with a coating 51 of dead black to provide opacity and to limit the transmission of light to that passing outwardly through the openings 50 which are within the range of the light from the lamp 43.

The mode of use will, it is thought be apparent from the foregoing but will be briefly summarized.

The star projector is preferably set up on a table of normal height in a room which is dark or darkened and from which light leakage is excluded.

With the switch in its "on" position, current is supplied through the leads 16 and 17 to the transformer 11, and therefrom at reduced voltage to the lamp 43. The sphere 30 may then be tilted to the desired extent, such for example as to correspond to the latitude of the place of the user, the post 26 being movable in the channel 24, and the spring 34 pressing the washer 33 into frictional engagement with the outer face of the dome 20 on both sides of the channel 24 to prevent swinging, sliding or other undesired displacement and retaining the set position.

The light rays from the filament of the lamp 43 will pass outwardly in the upper portion of the sphere 30, as limited by the margins of the lamp socket 38 and will be projected through the openings 50 and onto the walls of the room where the various stars and constellations will then be available for viewing. It is not necessary that the room be of spherical or other special shape although it is preferable that the walls onto which the projection is effected have a minimum of interruptions such as pictures, and the like.

The sphere 30 may then be moved or slowly rotated by hand on the axis provided by the post 26 so that the various constellations are successively brought into view in the same manner as they are to be seen in the sky by an observer at a fixed location and with the passage of time, or at different seasons of the year.

The brilliance of the display may be varied by manipulation of the rheostat 14 to obtain the desired level of light projection.

I claim:

1. A star projector comprising a base having a portion with a quadrantal slot, a hollow mounting post pivotally mounted on said base and extending outwardly therefrom and movable in said slot, a hollow sphere having star patterns thereon for the projection of light therethrough, said sphere having separable portions for access to the interior thereof, members for rotatably mounting said sphere on said post, a light source in said sphere pivotally mounted on said post, a pendular member for facing said source in a predetermined direction, and conductors for said source extending through said post.

2. A star projector comprising a base having a spherical portion with a quadrantal slot, a hollow mounting post pivotally mounted on said base and extending outwardly therefrom and movable in said slot, a hollow sphere having star patterns thereon for the projection of light therethrough, said sphere having separable portions for access to the interior thereof, said post having an enlarged head for interior engagement with said sphere, spaced members on said post in engagement with the exterior of the sphere and with said spherical portion, a resilient member interposed between said spaced members, a light source in said sphere pivotally mounted on said post, a pendular member for facing said source in a predetermined direction, energizing conductors for said source extending through said post, and control means on said base for varying the intensity of the light from said source.

3. A star projector comprising a base having wall portions providing an upwardly facing quadrantal slot, a mounting post pivotally mounted on said base at the lower part of the slot and movable in said slot from vertical to inclined positions, a hollow spherical body having star patterns thereon for projection of light therethrough, a light source in said spherical body, and a member on said post in engagement with the exterior of said spherical body for holding said spherical body on said post for rotation.

4. A star projector comprising a base having wall portions providing an upwardly facing quadrantal slot, a mounting post pivotally mounted on said base at the lower part of the slot and movable in said slot from vertical to inclined positions, a hollow spherical body having star patterns thereon for projection of light therethrough, a light source in said spherical body, spaced members on said post in engagement with the exterior of said spherical body and said base, and a resilient member interposed between said spaced members for retaining said post at a set position.

5. A star projector as defined in claim 4 in which the light source is pivotally mounted on said post within said spherical body and has a pendular member for facing said source in a predetermined direction and a screen member for determining the horizon of the star patterns.

6. A star projector as defined in claim 4 in which electrical control means for the intensity of the light from said source is provided on said base.

7. A star projector comprising a base having wall portions providing an upwardly facing quadrantal slot, a mounting post pivotally mounted on said base at the lower part of said slot and movable in said slot from vertical to inclined positions, a hollow spherical body having star patterns thereon for projection of light therethrough, a light source in said spherical body, members for rotatably mounting said spherical body on said post, and a resiliently urged member for engagement with said base for restraining the movement of said post from a predetermined set position.

8. A star projector comprising a base having a portion with an upwardly facing quadrantal slot, a hollow mounting post pivotally mounted on said base and extending outwardly therefrom and movable in said slot, a hollow spherical body having star patterns thereon for the projection of light therethrough, members for rotatably mounting said spherical body on said post, a light source in said spherical body pivotally mounted on said post, a horizon determining screen for the star patterns carried by said light source, a pendular member for facing said source in a predetermined direction, and conductors for said source extending through said post.

9. A star projector comprising a base having a spherical portion with an upwardly facing quadrantal slot, a hollow mounting post pivotally mounted on said base and extending outwardly therefrom and movable in said slot, a hollow spherical body having star patterns thereon for the projection of light therethrough, spaced members on said post in engagement with the exterior of the spherical body and with said spherical portion, a resilient member interposed between said spaced members, a light source in said spherical member pivotally mounted on said post, a horizon determining screen for the star patterns carried by said light source, a pendular member for facing said source in a predetermined direction, energizing conductors for said source extending through said post, and control means on said base for varying the intensity of the light from said source.

References Cited in the file of this patent

UNITED STATES PATENTS

| | | |
|---|---|---|
| 1,616,736 | Bauersfeld | Feb. 8, 1927 |
| 1,857,546 | Hirschl | May 10, 1932 |
| 2,039,878 | Boykow | May 5, 1936 |
| 2,178,352 | Unglaube et al. | Oct. 31, 1939 |
| 2,393,310 | Crane | Jan. 22, 1946 |
| 2,483,216 | Marshall | Sept. 27, 1949 |
| 2,632,359 | Spitz | Mar. 24, 1953 |